United States Patent [19]

Davis et al.

[11] Patent Number: 4,496,410
[45] Date of Patent: Jan. 29, 1985

[54] PRODUCTION OF DIMENSIONALLY RECOVERABLE ARTICLES

[75] Inventors: Frederick J. Davis, Swindon; Donald G. Peacock, Kempsford, both of England

[73] Assignee: Raychem Limited, England

[21] Appl. No.: 361,294

[22] Filed: Mar. 24, 1982

[30] Foreign Application Priority Data

Apr. 2, 1981 [GB] United Kingdom ............... 8110397

[51] Int. Cl.³ ............................................. B32B 31/18
[52] U.S. Cl. ......................................... 156/84; 156/85; 156/86; 156/272.2; 264/230; 264/342 R; 264/571; 428/35; 428/36
[58] Field of Search ...................... 156/84, 85, 86, 514, 156/285, 272.2, 293, 294; 174/DIG. 8; 264/230, 342 R, 571; 428/35, 36, 910

[56] References Cited

U.S. PATENT DOCUMENTS

| 3,434,908 | 3/1969 | Macdonald | 156/514 |
| 3,455,336 | 11/1969 | Ellis | 138/156 |
| 3,490,979 | 1/1970 | Calvert et al. | 156/514 |
| 3,536,822 | 10/1970 | Weegant | 174/DIG. 8 |
| 3,982,564 | 9/1976 | Clabburn et al. | 174/DIG. 8 |
| 4,275,180 | 4/1978 | Clarke | 428/458 |
| 4,342,800 | 8/1982 | Changani et al. | 428/36 |
| 4,345,957 | 8/1982 | Changani et al. | 156/86 |
| 4,366,201 | 12/1982 | Changani et al. | 156/86 |
| 4,422,890 | 12/1983 | Penneck | 156/244.13 |

FOREIGN PATENT DOCUMENTS

| 990235 | 4/1965 | United Kingdom . |
| 1010064 | 11/1965 | United Kingdom . |
| 1116878 | 6/1968 | United Kingdom . |
| 1284082 | 8/1972 | United Kingdom . |
| 1286460 | 8/1972 | United Kingdom . |
| 1294665 | 11/1972 | United Kingdom . |
| 1357549 | 6/1974 | United Kingdom . |

Primary Examiner—Caleb Weston
Attorney, Agent, or Firm—James W. Peterson

[57] ABSTRACT

First and second bodies of heat recoverable polymeric material are fusion bonded together with their directions of recovery at an angle to each other, the bond preferably being cross-linked after bonding to enable the resulting article better to withstand the recovery forces encountered in use. The invention is especially useful for making wraparound tubular enclosures for "T"'s and bends which enclosures in use will recover radially about two tubular axes.

16 Claims, 7 Drawing Figures

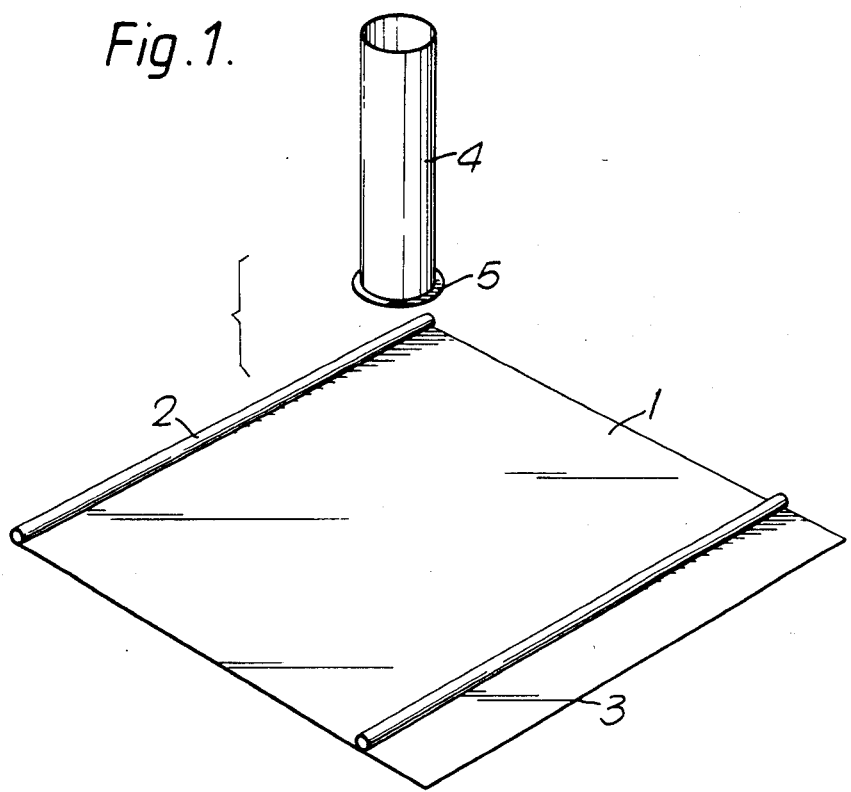
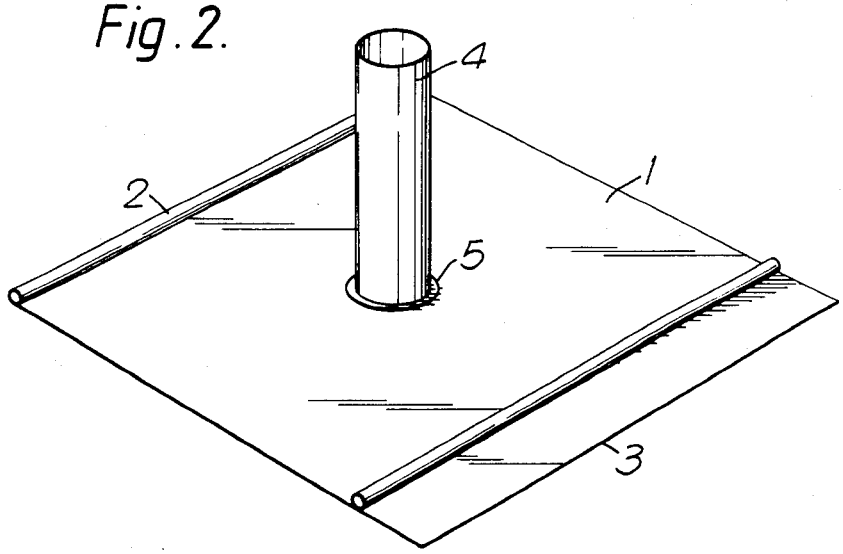

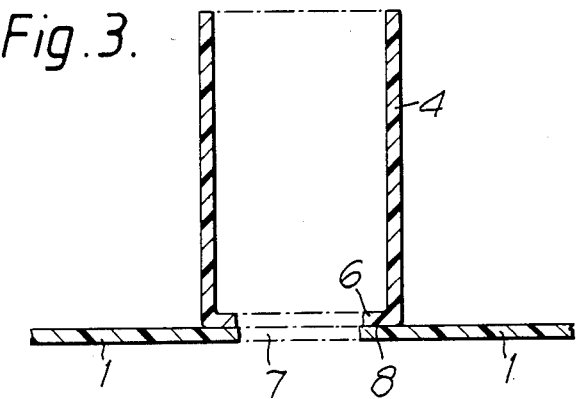
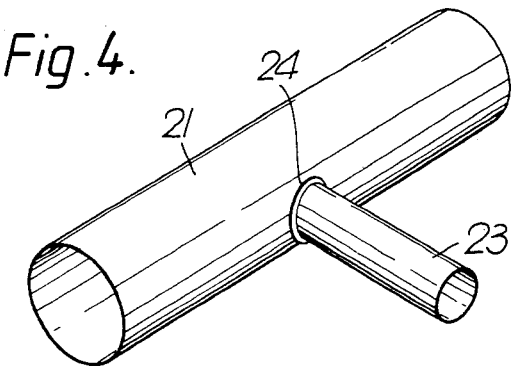
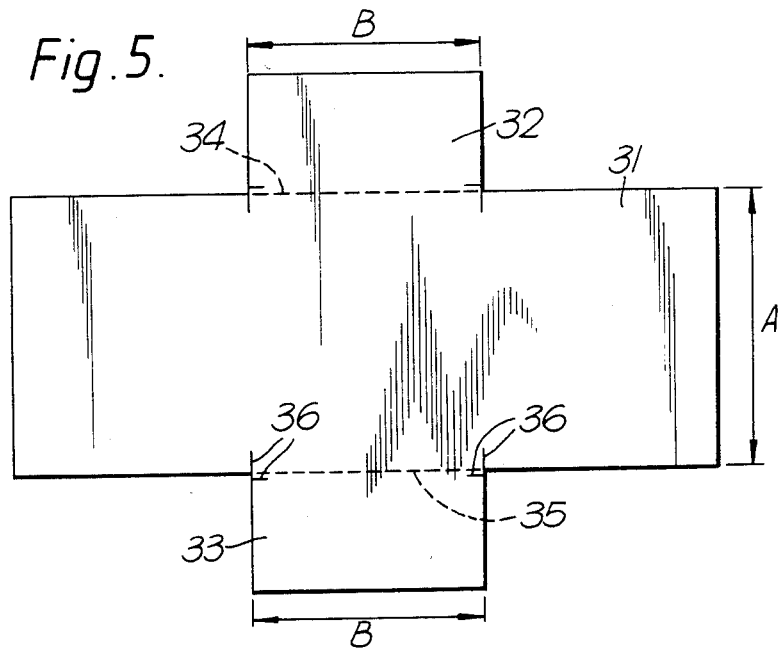

PRODUCTION OF DIMENSIONALLY RECOVERABLE ARTICLES

This invention relates to dimensionally heat-recoverable articles, that is to say, articles the dimensional configuration of which may be made to change by subjecting them to heat.

Heat-recoverable articles have become widely used in recent years for protecting objects such as pipes and cables from mechanical or chemical damage or to provide electrical insulation. Hitherto, heat-recoverable articles have generally been produced by forming a polymer into the desired heat-stable configuration, cross-linking the polymeric material, heating the article to a temperature above the crystalline melting point or softening point of the cross-linked polymer, deforming the article and cooling the article whilst in the deformed state so that the deformed configuration is retained. In use, since the deformed state of the article is heat-unstable, application of heat will cause the article to revert or tend to revert to its original heat-stable configuration.

When articles are of such a configuration that they cannot be produced directly by extrusion, for example if they have a cross-section that is not completely uniform, they have usually been formed by compression, injection or transfer moulding into the desired shape, curing the articles before removing them from the mould and expanding the formed articles for example by means of mandrels. Examples of such articles include so called "T"'s or branch-outs for enclosing the portion of a pipe or cable from which another pipe or cable branches. The branch-out may for example be in the form of a hollow tube having a tubular side arm extending therefrom or it may be in the form of a "wrap-around" device, that is, a device having an open configuration which can be closed after it has been positioned about the object to be enclosed. An example of a wrap-around device is described in U.S. Pat. No. 3,455,336, the disclosure of which is incorporated herein by reference.

The present invention provides a process for the production of a heat-recoverable article comprising at least two component parts having different directions of recovery, which process comprises (a) deforming a first body of fusion bondable polymeric material constituting one of the component parts at a temperature below the softening point of the material to render the material heat-recoverable, (b) forming a bond between one or more parts of the first body and a second body of fusion bondable polymeric material constituting another of the component parts which has been deformed at a temperature below the softening point of the material to render the material heat-recoverable, so that the direction of deformation of the first body is at an angle to the direction of deformation of the second body, and (c) cross-linking the bond between the deformed first body and the second body.

It is to be understood that references to "seam bonded" articles mean articles wherein two parts are seamed together by bonding in a manner somewhat analogous to sewing, and are specifically intended to exclude laminates and coextrusions in which a major surface of one layer is substantially wholly bonded to a major surface of another layer. Articles having bonds of relatively large surface area are not, however, excluded provided that the article is clearly seamed together, for example as viewed from inside a hollow article which may be externally surrounded by a large bonded area, as in the case of two sheets bonded together to form a plurality of hollow articles with large bond areas between adjacent articles.

The bonded region is preferably elongate and of narrow width, and may define the outline of the said article. The bonding of the first and second bodies may be achieved via further bonding material in addition to the first and second bodies, which further material is cross-linked with that of the bodies.

Preferably the first body is a tube, one end of which is bonded to a sheet (the second body), the latter preferably carrying means for closing opposable edges of the sheet together to form a tube lying at an angle to the first body tube.

The first and second bodies thus constitute two component parts of the article. By the direction of deformation of one component part being at an angle to the direction of deformation of another part, is meant that the respective directions of deformation, and hence the directions of recovery, of any two parts of the article, preferably two adjacent parts thereof, are not parallel along at least part of their common boundary if one exists. In most cases the directions of recovery will differ considerably, for example by an angle of between 45° and 135° C., and will often be substantially mutually perpendicular.

The present invention is particularly suitable for the production of heat-recoverable articles of complex configurations, i.e. of non-uniform cross-sections, which have hitherto been formed by moulding. When articles are manufactured according to the present invention, it is often possible to form the component parts by extrusion, thereby dispensing with the relatively expensive moulding processes. Also, if the component parts are formed by extrusion, they may be expanded by in-line expansion techniques, for example they may be continuously expanded in the machine direction or in the transverse direction, or, if the component parts are extruded as a tube, the tube may be expanded pneumatically.

When the component parts are stretched before they are bonded together, it is not necessary to expand the formed articles on an item-by-item basis as is the case with moulded articles.

In many instances it is desirable to form a number of parts of the same general configuration but in which there are slight differences in configuration between the articles. For example a number of branch-outs may be required in which the side arms differ in number, in diameter or length, or in their position on the main sleeve. This type of variation may easily be accommodated in the process according to the invention by adjustment of the production machinery or in the selection of the component parts, whereas, as will be appreciated, such variations can be allowed by conventional production processes only by manufacturing a new mould for each variation.

It has surprisingly been found that it is possible to form bonds between the component parts that are sufficiently strong to withstand the recovery forces of the different parts at the recovery temperature of the polymeric material (about 120° C. in the case of polyethylene) even though the direction of recovery of adjacent portions of the article differs along parts of the weld lines and the wall thickness of the polymeric material may be as high as 0.5 mm or higher, for example greater than 1 mm.

It is possible for different component parts of the article to be formed from different polymeric materials or compositions so that the properties of the article such as flexibility or electrical conductivity can be varied within a single article.

For example one part may have semiconducting electrical characteristics while another part may have insulating characteristics.

Any of the techniques conventionally employed for fusing together polymeric materials may be employed in the process of the present invention, e.g. radio frequency, ultrasonic or hot bar welding, and pressure may additionally be applied to ensure a satisfactory bond. In many cases it may be desirable to remove surplus polymeric material from one component part adjacent to the weld seam, in which case this is advantageously done in the same step as the welding operation. For example if a tubular side arm is to be welded on to a tubular sleeve forming the main body of a branch-out, a corresponding aperture may be formed in the sleeve before or after the side arm is welded on but is preferably formed during welding. This may be achieved by suitably forming the welding equipment. Thus if the component parts are joined by a hot-plate welding method, the welding plate may have a heated raised profile which will cut through the polymeric material adjacent to the weld line.

If the component parts are formed by extrusion, they will, at some stage, need to be separated into individual pieces. In some instances it may be possible to separate the extrusion forming the component parts during, or even after, the welding step. For example a tubular article that is initially straight but will bend to form an "elbow" on recovery may be formed by superimposing an extruded sheet having a direction of deformation in the machine direction upon an extruded sheet having a transverse direction of deformation, and welding together the longitudinally extending edges. The welded extruded product may then be cut into individual pieces.

This invention has the further advantage that it enables the production of certain forms of article that could not be manufactured by conventional production processes, such as articles of open configuration (e.g. in sheet form) in which different portions thereof have different directions of recovery.

These forms of article are particularly suitable as wrap-around devices for enclosing bent substrates, e.g. right angled bends in pipes, bus bars and the like, or branched substrates such as branches in pipes, cables, electrical harnesses and the like.

The present invention also provides a dimensionally heat-recoverable article comprising at least two parts having different directions of recovery, the parts being bonded together, preferably welded together.

Preferably, the bonding is effected by fusion of the said polymeric material, preferably in direct contact of the first body with the second body.

By the expresssion "fusion bonding" as employed herein is meant a process wherein the material in the parts to be bonded together is caused to flow to form the bond, e.g. welding by heat, solvent or ultrasonic or radio frequency energy, preferably with the application of pressure, either to form a bridge from the materials of the respective bodies or to fuse the parts with further material which is cross-linked with the material of the said parts by the cross-linking step of the process.

The bonding (preferably fusion) step may be effected either before or after the deformation step, preferably however after the deformation step. Bonding before deformation produces the configuration of the article before it is rendered heat recoverable, and care must be taken not to break the hood during the subsequent deformation. It will be understood that references to "hollow" articles include articles in a flat state which can be opened to reveal their hollow interior, and references to "tubular" articles include multi-legged, tapering, or irregular articles of a generally elongate hollow form, and these terms may refer to articles only part of which is hollow or tubular as aforesaid. The process is applicable to both crystalline and non-crystalline polymers, the softening point (by which is meant the crystalline melting point for crystalline polymers) being selected accordingly as the maximum deformation temperature.

By "fusion bondable" polymeric materials and substrates as employed herein is meant not cross-linked, or crosslinked only to the extent that the material can still be readily bonded to itself or to another polymeric component by fusing. In general, the level of cross-linking in the polymeric material expressed in terms of gel content (ANSI/ASTM D2765-68) is preferably less than 40%, more preferably less than 20%, particularly less than 5%. When crosslinking in accordance with the process, preferably gel contents of at least 40%, e.g. at least 50%, particularly at least 65% are attained.

Preferably, the cross-linking cross-links substantially all of the polymeric material in addition to the bond-forming material. Cross-linking is preferably performed after the deforming and bonding steps, but could be effected after the deformation step and during the bonding step. Of particular interest is a process wherein the second body to which part of the first body is bonded is another part of the first body, in which case the first body may be in the form of a tube expanded radially by the deformation step, or may be a web which is expanded longitudinally by the deformation step.

In a further preferred process the deforming step locally deforms at least one substantial region of the first body, the second body is locally deformed in at least one substantial region at a temperature below the softening point of the material to render it heat recoverable, and the first body is bonded to the second body with their respective deformed regions co-operating with each other to produce hollow said article(s). Vacuum forming of a web of polymeric material is the preferred method of performing the localised deformation.

Hollow heat-recoverable articles produced by the process of the invention also form part of the present invention.

One advantage of the articles of the invention is that they are substantially recoverable, e.g. to at least 50% of their maximum extent, at a temperature below the softening point of the polymeric material from which they have been produced, e.g. in the range 60° C. to the crystalline melting point or softening point.

The process is particularly useful in the manufacture of heat-recoverable boots, transitions, udders and end-caps for electrical applications, e.g. electrical cables, the use of such products being extensive and well reported in the literature, e.g. Proc. IEE 1970j. 117(7), 1365–1372.

The process of the present invention also lends itself to the production of such articles having parts thereof of different polymeric composition so that the properties of the article such as flexibility or electrical conductivity can be varied within a single article. For example, one part of an article such as the multiple legs of a cable udder may be produced as a single component by blow moulding, e.g. from an extruded tube of one material, to the desired configuration and another part, e.g. the cable side of the udder, produced in tubular form by extrusion of a different material with subsequent expansion. When blow moulding techniques are employed, it is found that this may provide the necessary degree of deformation to impart heat-recoverability to the final article. The two parts are subsequently bonded together in the desired configuration.

In such manner, the legs of the udder may, e.g. have semiconducting electrical characteristics and the cable inlet part insulating characteristics.

In the production of heat-recoverable articles in accordance with the invention, it is not always necessary to deform the whole of the polymeric starting material. For example, when employing polymeric material in the form of a web, it is possible locally to deform specific areas of the web, for example by pressing or by vacuum forming at an elevated temperature below the crystalline melting point or softening point of the material with subsequent cooling to maintain the deformed condition of the deformed components so formed. Such deformed components may then be fused to other components, for example to a similar component formed in a separate web, to produce the configuration of the desired product.

Hollow heat recoverable articles produced in accordance with the process of the invention may advantageously be coated internally with an adhesive or other sealant, as described and claimed in U.K. Application No. 8024622 e.g. an adhesive such as described in U.K. Pat. No. 1,116,878 the disclosure of which is incorporated herein by reference. The application of the sealant may be effected before, during or after the process of the invention by appropriate choice of adhesive or sealant and process conditions. For example, a hot-melt adhesive may be applied to the polymeric material before the fusion step and thereafter the parts to be fused together locally heated and pressed together to locally displace the adhesive in the regions to be fused together.

Alternatively, the sealant may be applied after the bonding step and, where the process involves producing a plurality of separable articles, the sealant is preferably applied before separation of the articles.

If self-adhesion of sealant-coated contacting parts is a problem, then such parts may be separated by a non-adherable material such as release paper.

Any fusion bondable polymeric material which can be cross-linked by the cross-linking step(c) and to which the property of dimensional recoverability may be imparted such as those disclosed in U.K. Specification No. 990,235 may be used to form the articles. Polymers which may be used as the polymeric material include polyolefins such as polyethylene and polypropylene, and ethylene copolymers, for example with propylene, butene, hexene, octene, vinyl acetate or other vinyl esters or methyl or ethyl acrylate, polyamides, polyurethanes, polyvinyl chloride, polyvinylidine fluoride, or other fluorinated polymers or copolymers, e.g. Tefzel (trade name—commercially available from Dupont), elastomeric materials such as those disclosed in UK specification No. 1,010,064 and blends such as those disclosed in UK specification Nos. 1,284,082 and 1,294,665, and compositions such as those disclosed in our U.S. Pat. No. 4,275,180. The polymeric materials cn be tailored to suit the intended use by the addition of fillers, e.g. semiconducting fillers or anti-tracking agents, flame retardants, plasticisers, pigments, stabilisers and lubricants, or where necessary, e.g. where the polymeric material is substantially non-crystalline, a hold-out agent such as a thermoplastic polymer, e.g. polyethylene, may be included in the material.

The polymeric material may be cross-linked by irradiation, for example, by means of an electron beam or by gamma radiation or it may be chemically cross-linked. Whichever cross-linking process is used, it may be advantageous to incorporate one or more co-curing agents for example polyunsaturated monomers such as triallyl cyanurate, triallyl isocyanurate, diallyl phthalate, ethylene glycol dimethacrylate, trimethylolpropane trimethacrylate, pentaerythritol tetramethacrylate, allyl methacrylate and vinyl methacrylate. One method of chemical cross-linking that may be used in the process according to the invention involves grafting an unsaturated hydrolysable silane on the polymer and subjecting the article to moisture during a curing stage, for example, as described in UK Patent specification Nos. 1,286,460 and 1,357,549.

If the seam bonded heat-recoverable article is produced with an undesired protruding external weld, then this may be avoided by turning the article inside-out.

As hereinbefore described, the process is particularly appropriate in the production of hollow heat-recoverable articles for use in the electrical field, e.g. boots, udders and end-caps. In general, such products are characterised by a wall thickness prior to heat-recovery thereof of preferably from 0.1 to 5 mm, especially from 0.5 to 3 mm e.g. 1 to 3 mm.

Several forms of device formed in accordance with this aspect of the present invention will now be described by way of example with reference to FIGS. 1 to 7 of the accompanying drawings in which:

FIGS. 1 and 2 show one form of wrap-around article before and after welding of the component parts;

FIG. 3 shows a modification of the article shown in FIG. 2;

FIG. 4 shows a tubular article formed in accordance with the invention; and

FIGS. 5 to 7 show three further forms of wrap-around article.

Figure 6:
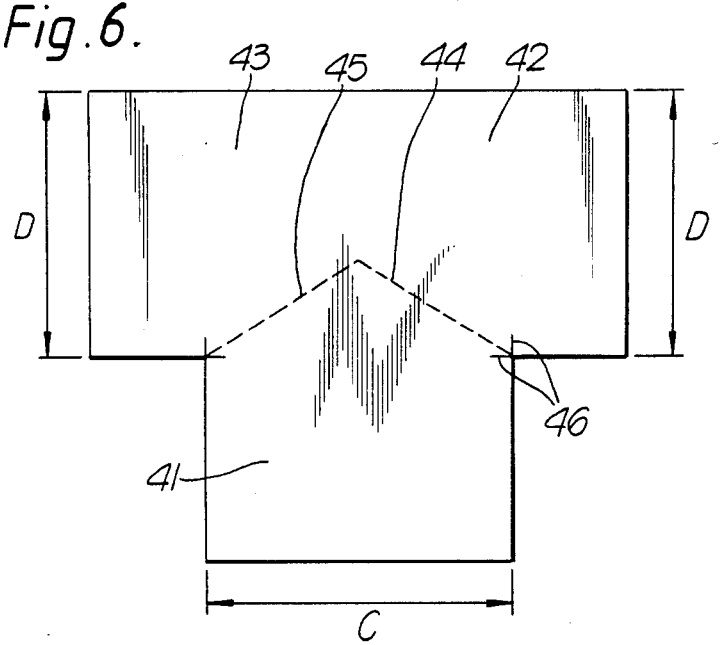

Referring to FIGS. 1 and 2 of the accompanying drawings, an article for enclosing a right-angled branch-out in a cable, for example a telephone cable comprises a sheet 1 that has been extruded and uniaxially stretched below the melting or softening point of the polymeric material in the transverse direction, that is, in a direction perpendicular to its edges 2 and 3. The sheet is provided with a mechanical wrap-around closure system as described in U.K. Patent Application No. 8024620, the disclosure of which is incorporated herein by reference. A tubular side arm or outlet 4 that has been pneumatically expanded in the radial direction at a temperature below the melting or softening point of the polymeric material is welded to the sheet 1 by forcing the wall at one end of the side arm 4 into an outwardly extending flange 5, positioning the side arm 4 at the appropriate point on the sheet 1, welding the flange 5 to the sheet 1 and forming an aperture in the sheet 1 at the end of the side arm 4. The aperture may be formed before the welding step if desired. After welding the polymeric material of the article is cross-linked by irradiation with 6 MeV electrons to a dose of about 10 Mrads.

The configuration of the article may be altered to suit any particular requirements if necessary, for example by altering the length or diameter of the side arm 4, by varying the position of the side arm 4 on the sheet 1 or by welding more than one side arm 4 onto the sheet 1.

FIG. 3 is a cross-section through the sheet 1 and tubular side-arm 4 of an article similar to that shown in FIG. 1 but in which, before welding, one end of the side-arm 4 has been deformed into an inwardly facing flange 6. In this embodiment an aperture 7 may be cut in the sheet 1 during formation of the weld 8 between the side arm 4 and the sheet 1.

It will be appreciated that the sheet 1 could be substantially non-heat-recoverable (e.g. less than 10% recovery) even semi-rigid, with one or more "side arm" tubes bonded to perforations therein, and cross-linked, such an arrangement being within the scope of this invention as a whole although not having the bi-directional deformation with which the present embodiment of the invention is concerned.

FIG. 4 shows an article suitable for enclosing a branch-out in a cable or electrical harness where the end of the cable or harness is readily accessible. The article comprises a tubular main-body 21 and a tubular side arm that are joined together by the methods described with reference to FIGS. 1 to 3 at a weld line 24. As will be appreciated, in the devices shown in FIGS. 1 to 4, the direction of recovery of the two parts will be parallel at some points along the weld line and will be mutually perpendicular at other points.

FIG. 5 shows another form of wrap-around article suitable for enclosing a branch-out in an electrical cable or harness. The article is formed in a generally cruciform configuration and comprises a main body 31 that has been extruded and expanded in the direction of arrows A and has two side parts 32 and 33 that have also been extruded and have been expanded in the direction of arrows B, i.e. perpendicular to the direction of expansion of the body 31. After expansion the side parts 32 and 33 are welded to the main body 31 along weld lines 34 and 35 and the article is irradiated to a dose of about 10 Mrads of 6 Mev electrons to cross-link the polymeric material. Either before or after irradiation small incisions 36 may be made in the article so that the edges of the main body 31 and side portions 34 form flaps that can overlie each other when the article is installed.

In order to install the article, an adhesive for example an epoxy adhesive is applied along the appropriate edges of the main body 31 and side parts 32 and 33, and the main body is wrapped around the main line of the cable or harness so that the side parts 32 and 33 lie on opposite sides of the cable or harness branch. The edges of the main body 31 are bonded together and the edges of the side part 32 are bonded to the corresponding edges of the side part 33, after which the article may be heated by means of a hot-air gun or gas torch to recover it about the cable or harness.

FIG. 6 shows another form of wrap-around device that is particularly suitable for enclosing right-angled bends or "elbows" in objects such as electrical bus bars. The device has a generally "T" configuration and comprises part 41 having a direction of stretching indicated by arrows C and parts 42 and 43 having a direction of stretching indicated by arrows D, the parts 42 and 43 being welded to part 41 along the weld seams 44 and 45 respectively. Incisions 46 are made in the polymeric material to allow the edges of parts 41, 42 and 43 to be bonded and the article is irradiated by high energy electrons to cross-link the polymeric material.

The device may be installed by applying an epoxy adhesive to the edges, positioning it about the "T" and heating it as described above.

Figure 7:
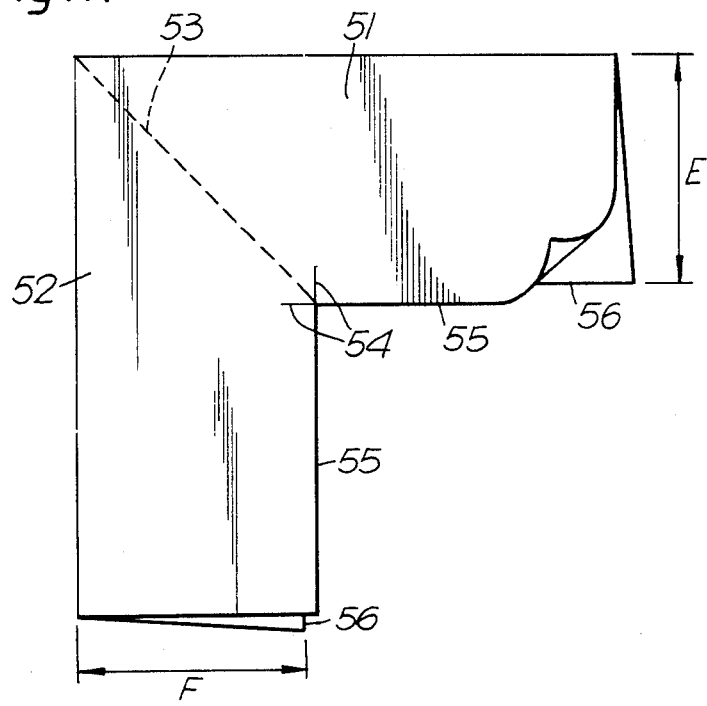

FIG. 7 shows a further form of device suitable for enclosing right-angled bends in bus-bars. This device has been formed by stretching non-cross-linked sheet and folding the sheet perpendicular to the direction of stretching. One end of each portion of folded sheet is cut along a line 53 at an angle of 45° to the fold and two portions of the sheet are welded together along the said line so that the device is substantially "L" shaped as shown in the drawing and comprises two parts 51 and 52 having directions of stretch indicated by arrows E and F. Incisions 54 are made in the device to enable the edges 55 to be bonded to the edges 56 by an adhesive. The device is irradiated to a dose of 10 Mrads of 6 MeV electrons and can then be installed as described above.

In all embodiments of this invention, the fact that the polymeric material is cross-linked after the article has been assembled enables it to be cross-linked by irradiation, thereby reducing the time taken for cross-linking, obviating the necessity to incorporate peroxide or other chemical curing agents in the material, and strengthening the bonded regions. The latter feature is particularly significant when the first and second bodies have been bonded together by fusion and results in strong cross-linked bonded regions. The fusion bonding is preferably carried out under such pressure and other conditions as will cause a bead of fused material to be exuded along the edge of the bonded seam, thus indicating a high degree of flow of the bond material to enhance the effectiveness of the bonding.

We claim:

1. A process for the production of a heat-recoverable article comprising at least two component parts having different directions of recovery, which process comprises
    (a) deforming a first body of fusion bondable polymeric material constituting one of the component parts at a temperature below the softening point of the material to render the material heat-recoverable,
    (b) forming a bond between one or more parts of the first body and a second body of fusion bondable polymeric material constituting another of the component parts which has been deformed at a temperature below the softening point of the material to render the material heat-recoverable, so that the direction of deformation of the first body is at an angle to the direction of deformation of the second body, and
    (c) cross-linking the bond between the deformed first body and the second body.

2. A process according to claim 1 wherein the first and second bodies are seam bonded together.

3. A process according to claim 1 wherein the bonding is effected by fusion of the said polymeric material.

4. A process according to claim 1 or 2 wherein the bond-forming material includes further material in addition to the first body and the second body and the cross-linking cross-links the said further material with that of the first body and the second body.

5. A process according to claim 1, 2 or 3 wherein the cross-linking cross-links substantially all of the said polymeric material in addition to the bond.

6. A process according to claim 1, 2 or 3 wherein the cross-linking is effected after the deforming and bonding steps.

7. A process according to claim 1, 2 or 3 wherein the cross-linking is effected after the deforming step and during the bonding step.

8. A process according to claim 1, 2 or 3 wherein the cross-linking is effected by means of ionising radiation.

9. A process according to claim 1, 2 or 3 wherein the fusion bondable polymeric material before the cross-linking step has a gel content as measured by test method ANSI/ASTM D2765-68 of less than 5%.

10. A process according to claim 1 wherein the first body is a tube one end of which is bonded to a second body.

11. A process according to claim 10 wherein the tube is bonded to the second body which is a sheet and which carries closure means for closing opposable edges of the sheet together to form a tube lying at an angle to the first body tube.

12. A process according to claim 1 wherein the deforming step locally deforms at least one region of the first body, the second body is locally deformed in at least one region at a temperature below the softening point of the material to render it heat recoverable, and the first body is bonded to the second body with their respective deformed regions co-operating with each other to produce one or more hollow said article(s).

13. A process according to claim 12 wherein the deforming of the first body and/or of the second body is effected by vacuum forming of a web of the polymeric material.

14. A process according to claim 1, 2 or 3 wherein the bonding is effected so as to produce the configuration of a plurality of separable articles.

15. A process according to claim 1, 2 or 3 wherein the polymeric material after deformation has a wall thickness in the range from 0.1 to 5.0 millimeters.

16. A process according to claim 1, 2 or 3 wherein the resulting article is shaped and non-planar.

* * * * *